Patented July 20, 1926.

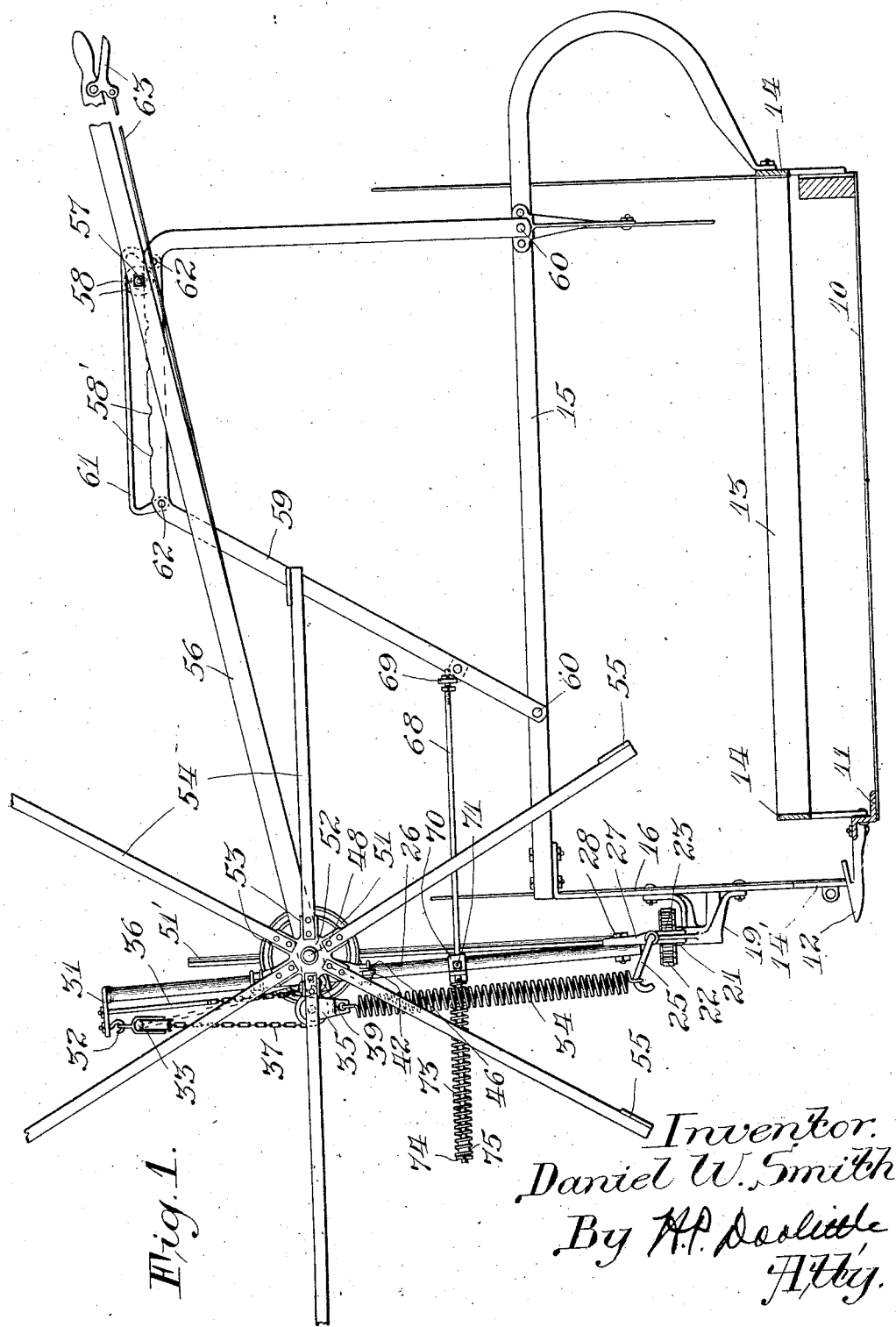

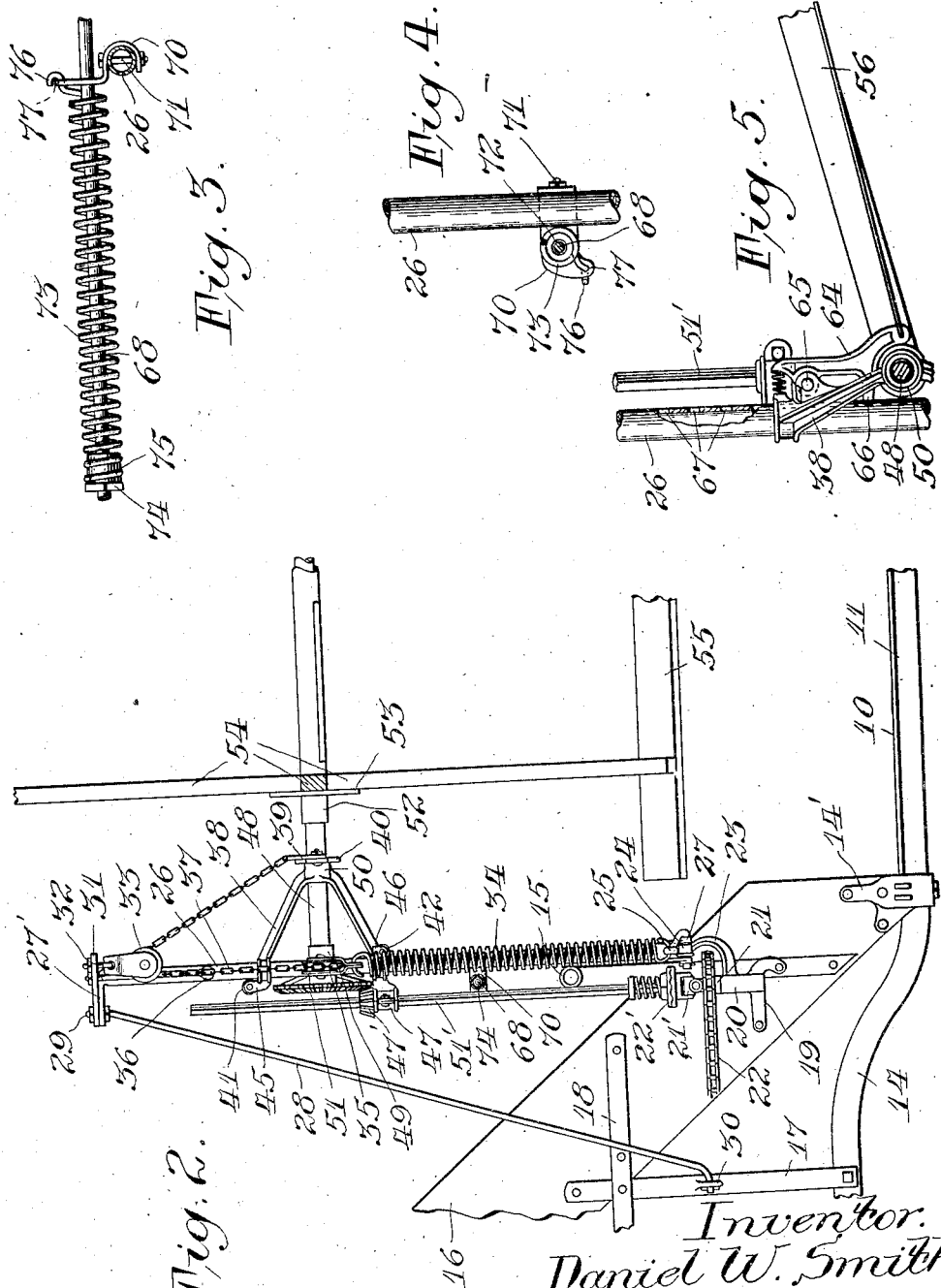

1,592,872

UNITED STATES PATENT OFFICE.

DANIEL W. SMITH, OF OAK PARK, ILLINOIS, ASSIGNOR TO INTERNATIONAL HARVESTER COMPANY, OF CHICAGO, ILLINOIS, A CORPORATION OF NEW JERSEY.

HARVESTER REEL.

Application filed June 19, 1922. Serial No. 569,362.

My invention relates to harvesters.

One of the objects of the present invention is to provide an improved means for controlling and balancing the reel of a harvester in a manner to sustain the same in a position substantially parallel with the cutting mechanism of the harvester.

A further object is to provide a reel controlling mechanism in which the various parts are so balanced that the reel may be adjusted to its different positions of adjustment with the least expenditure of effort on the part of the operator.

A still further object is to provide a double acting spring mechanism for normally maintaining the reel in a vertical position.

These and other objects are accomplished by providing a novel construction and arrangement of the various parts which cooperate with the reel and reel support in a manner to maintain the reel in substantial balance.

Referring to the drawings—

Fig. 1 is a side elevational view of the essential parts of a harvester showing my improved reel mechanism embodied therein;

Fig. 2 is a front elevational view of Fig. 1;

Fig. 3 is an enlarged top plan view of the double acting spring mechanism, the supporting pipe being arranged horizontally on the sheet merely for the sake of better arrangement of the figures thereon;

Fig. 4 is a sectional view of Fig. 3 on line 4—4 thereof; and

Fig. 5 is an enlarged detail view showing the means for locking the reel in its various positions of adjustment.

For the purpose of illustration I have shown my improved adjustable reel and balancing mechanism embodied in the standard type of harvester which comprises a platform 10 having a Z-bar 11 fixed thereto at the forward side. Secured by means of bolts to the Z-bar 11 are the usual guards 12. Secured to the platform 10 are the usual longitudinally and transversely disposed frame members 13 and 14 respectively. Extending upward from and secured to the rear of the transversely disposed frame 14 is the usual seat supporting pipe 15. Secured to the forward end of the seat pipe 15 and positioned diagonally upward from a bracket 14' secured to the main frame 14 is the elevator frame 16 which is braced to the main frame 14 by means of bars 17 and 18. Securely fixed to the forward side of the elevator frame 16 is a bracket 19. The bracket 19 is further provided with an upwardly and grasswardly extending arm 23 which is provided with a bearing support 24. A reel supporting pipe 26 is pivotally supported in the bearing support 24 by means of a bracket 27 fixed to the pipe by a bolt 28. The bracket 27 is provided with a bifurcated portion adapted to fit over the bearing 24 and to pivotally receive the hook pin 25. The pipe 26 is bent at right angles at its upper end 27' and is braced against lateral movement by a brace rod 28' secured to the pipe at 29 and pivotally secured to the harvester by means of a lug 30 secured to the bar 17. Secured to the right angularly bent portion 27' of the pipe 26 is a horizontally disposed plate 31 having an aperture therein which is adapted to pivotally receive a hook bolt 32. Pivotally journaled on the hook bolt 32 is a block and pulley 33 for the purpose hereinafter set forth.

My improved balancing mechanism for balancing the reel comprises a substantially vertically disposed spring 34 positioned parallel to the supporting pipe 26 and having its lower end connected to the hook pin 25 and its upper end connected to a block and pulley 35. Adjustably secured to the plate 31 is an eye bolt 36. Secured to the eye bolt 36 is a chain 37 which extends downward around the pulley or sheave 35 and upward from this point around the sheave 33 and from this sheave it extends downward and is connected at a point spaced from the supporting pipe 26 to a reel supporting bracket 38 by means of a clip 39 fixed to an ear 40 formed integrally with the bracket 38. The reel supporting bracket is provided with upper and lower rollers 41 and 42 respectively. The reel supporting bracket 38 is adjustably mounted on the pipe 26 by means of the conventional bearing and guide rollers 41 and 42 slidably engaging the pipe 26. The purpose of the rollers is to facilitate the adjustment of the reel and eliminate the friction. These rollers are mounted on the arms 45 and 46 formed integrally with the bracket 38. The bracket 38 is provided with a bearing portion 47 for the purpose hereinafter set forth.

The reel of the harvester comprises a pipe or shaft 48 supported at its stubbleward end in the bearings 49 and 50 formed integrally with the bracket 38. The grainward end of the platform may or may not carry a support for supporting the grainward end of the shaft and reel, it being unnecessary to show such constructions as they are well known in the art. Fixed to the stubbleward side of the shaft 48 is a beveled gear 51. The reel proper comprises a web bracket 52 fixed to the shaft 48 and provided with outwardly projecting sockets 53 adapted to receive and have securely fixed thereto diverging arms 54. Secured to the outer ends of the arms 54 are the usual reel bats 55. The reel is vertically and longitudinally adjusted by means of a lever 56 pivotally secured to the reel shaft 48 and extending rearwardly to within easy reach of the operator. The lever 56 is pivotally secured to the frame or to the harvester at 57 by means of a washer bolt and nut 58. The reel is adjustable in a vertical plane by the pivot 57 being adapted to be removably seated in a plurality of notches 58' formed in the sector bar 59 fixed to the seat pipe 15 by means of bolts 60. The lever 56 is limited in its horizontal movement by the guide rod 61 fixed to the sector bar 59 by means of rivets 62. The height of the reel above the cutting apparatus of the harvester is controlled by a detent connection 63 connected to a spring pressed pawl 64 which is pivoted at 65 to the brackets 38. The pawl 64 is provided with a forwardly projecting portion 66 which is adapted to be seated in any one of a plurality of apertures 67 formed on the rearward side of the supporting pipe 26. From the above description it will be understood that the adjustment of the height of the reel above the cutting apparatus is controlled by actuating the lever 56 about its pivot 57 and through the detent mechanism 63, the pawl 64 may be employed to lock the reel to the pipe 26 in the desired position of adjustment.

The reel is driven by a pinion 47' rotatably mounted in the bearing 47 and meshing with the gear 51. The pinion 47' is provided with a square aperture (not shown) extending longitudinally with respect thereto for slidably receiving a square shaft 51' which drives the reel. The shaft 51' is driven by the gearing mechanism 21 and 22 through a universal joint 21' and a slip clutch 22'.

My improved double acting spring mechanism for normally maintaining the reel supporting frame in substantially vertical position comprises a horizontally disposed rod 68 having its rearward end loosely secured to a bracket 69 fixed to the sector 59. The rod 68 extends forwardly and slidably engages a bracket 70 fixed to the pipe 26 by means of a bolt 71. The rod 68 extends through an aperture 72 in the bracket 70 and has its forward end adjustably connected to a double acting spring 73 by means of an adjustable threaded nut 74. The nut 74 is provided with threaded grooves 75 which are adapted to securely retain the forward end of the spring 73 to the nut 74. The rearward end of the spring 73 is provided with a hook portion 76 which is adapted to be secured to the bracket 70 in an aperture 77 formed in said bracket. From the above description it will be seen that the spring 73 functions as an extension and also as a compression spring. In other words, when the reel supporting frame is swung forward of its pivot on the hook 25, the spring 73 acts as a compression spring and normally tends to force the supporting frame in a rearward direction, and when the reel supporting frame 25 is swung rearwardly of its pivot, the spring 73 operates as an extension spring and normally tends to return the reel supporting frame to the normal vertical position.

In the operation of the above described mechanism, the reel, together with the reel supporting frame, is adjusted forwardly and rearwardly of the usual cutting apparatus indicated by the guards 12 of the harvester by adjusting the lever 56 with the bolt 57 engaging the various notches 58' in the sector 59 and, by reason of the double acting spring 73, the reel is readily adjusted to its various positions with little or no effort on the part of the operator. When the operator desires to adjust the height of the reel, the detent connection 63 is depressed disengaging the projection 66 of the pawl 64 from the aperture 67 in the pipe 26 and thus, by tilting the lever 56 about its pivot 57, the reel proper may be adjusted to its various positions of adjustment with great ease and facility by reason of the spring 34 balancing and overcoming the weight through the chain 37 trained about the sheaves 33 and 35 fixed to the plate 31 and spring 34 respectively. It should be further understood that by reason of the chain 37 being connected to the bracket 39 at a point spaced from the pipe 26, the tendency of the pipe or reel shaft 48 to sag at the outer end is considerably rduced and that by reason of this construction and arrangement, the reel can be readily and easily adjusted to its various positions of adjustment.

While I have described but one embodiment which my invention may assume in practice, it will be understood that the same is capable of modification and that modification may be employed without departing from the spirit and scope of my invention as described in the following claims.

What I claim as my invention and desire to secure by Letters Patent is:

1. In a harvester, the combination of a frame, a reel support pivotally mounted on the frame, and means including a rod connected to the frame and slidably carried intermediately of its ends by the reel support, said means acting to maintain the reel support in a substantially normal vertical position.

2. In a harvester, the combination of a frame, a reel support pivotally mounted on the frame, a rod connected to the frame and slidably carried intermediately of its ends by the reel support, and a spring on the rod exerting a force to maintain the reel support in a substantially normal vertical position.

3. In a harvester, a frame, a reel support pivotally mounted on said frame, and means comprising a double acting spring tending to maintain said reel support in a substantially normal vertical position.

4. In a harvester, a frame, a reel support pivotally mounted on said frame, and means comprising a rod pivotally connected to said frame and reciprocable with respect to said reel support tending to maintain said reel support in a substantially normal vertical position.

5. In a harvester, the combination of a frame, a reel support pivotally mounted on said frame and adapted to swing from one side of its pivot to the other, and means including a rod disposed above said pivot and supported by the frame and reel support, said means acting to maintain the support in a position directly over said pivot.

6. In a harvester, the combination of a frame, a reel support pivotally mounted on said frame and adapted to swing from one side of its pivot to the other, a rod carried by the frame and support above said pivot, and a single spring carried by the rod and acting on the support to maintain said support in a position directly over said pivot.

7. In a harvester, a frame, a reel support pivotally mounted on said frame and adapted to swing from one side of its pivot to the other, and means comprising a double acting spring exerting forces tending to return said reel support to a position directly over said pivot.

8. In a harvester, a frame, a reel support pivotally mounted on said frame and adapted to swing from one side of its pivot to the other side, a rod pivotally connected to said frame and slidably connected to said support, and resilient means connecting said rod with said support exerting a force tending to return said support to a position directly over said pivot.

9. In a harvester, a frame, a reel support pivotally mounted on said frame for movement in a vertical plane, and a spring mounted on said support and extending longitudinally and in parallel relation with respect thereto for balancing the weight of said reel.

10. In a harvester, a frame, a reel, a reel support pivotally mounted on said frame, a spring connected to said support having a sheave connected at one end thereof, a sheave mounted on said support, and a chain connected to said support and trained about said sheaves and connected to said reel for balancing said reel.

11. In a harvester, a frame, a reel support pivotally mounted on said frame, a reel carried by said support, double acting means exerting forces tending to maintain said support in a normal vertical position, and means mounted on said support for adjustably balancing said reel.

12. In a harvester, a frame, a reel, a reel support pivotally mounted on said frame, a spring connected to said support having a sheave connected at one end thereof, a sheave mounted on said support, a chain connected to said support and trained about said sheaves and connected to said reel for balancing said reel, and a double acting means exerting forces tending to maintain said reel support in substantially a vertical plane.

13. In a harvester, a frame, a reel, a reel support pivotally mounted on said frame, a spring connected to said support having a sheave connected at one end thereof, a sheave mounted on said support, and a chain connected to said support and trained about said sheaves and connected to said reel at a point spaced from said support for balancing said reel.

14. In a harvester, a frame, a reel support pivotally mounted on said frame, a reel rotatably carried on said support, a spring extending parallel with and connected to said support for balancing said reel, and a double acting spring positioned substantially at right angles to said first mentioned spring for balancing the reel substantially in a vertical plane with respect to said support.

15. In a harvester, a frame, a reel having a shaft and supported for movement in a vertical plane, and means including a flexible element engaging said shaft intermediate its ends for preventing sagging thereof and maintaining it in a substantially horizontal position during its vertical movements.

16. In a harvester, a frame, a support thereon, a reel shaft carrying a reel mounted on the support and adjustable in a vertical plane with respect to the support, and means including a flexible element connected to the support and to the shaft intermediate its ends for preventing sagging of the reel and shaft and maintaining it in a substantially horizontal position during its vertical movements.

In testimony whereof I affix my signature.

DANIEL W. SMITH.